Aug. 16, 1960 L. PÉRAS 2,949,173
AUTOMATIC DEVICES FOR ADJUSTING DISK BRAKES
Filed June 3, 1958

INVENTOR.
LUCIEN PERAS
BY
ATTORNEY

United States Patent Office 2,949,173
Patented Aug. 16, 1960

2,949,173

AUTOMATIC DEVICES FOR ADJUSTING DISK BRAKES

Lucien Péras, Billancourt, France, assignor to Regie Nationale des Usines Renault, Billancourt, France, a French works Filed June 3, 1958, Ser. No. 739,629

Claims priority, application France June 4, 1957

3 Claims. (Cl. 188—196)

This invention relates to an automatic device for adjusting brakes, more particularly disk brakes, or for any other mechanism in which it is useful to maintain a constant gap or clearance in spite of the wear in parts subjected to friction.

Automatic adjustment devices have already been proposed which are capable of maintaining at a constant value the distance between the friction linings and, for example, the brake disk, irrespective of the lining wear.

It is the essential object of this invention to provide a specific form of automatic adjustment wherein the play takeup action is obtained by using a screw of special predetermined pitch and thread form, more specifically a rectangular-trapezoidal thread form, said screw being rigidly connected with one of the lining control members and engaging a nut carried by the other control member, the screw being reversible for an axial stress in one direction and irreversible for an axial stress in the opposite direction.

In the accompanying drawings a specific form of embodiment of the brake adjustment device of this invention is illustrated by way of example as applied to the means for controlling the movements of two friction linings towards and away from a brake disk. In the drawings.

Figure 1:
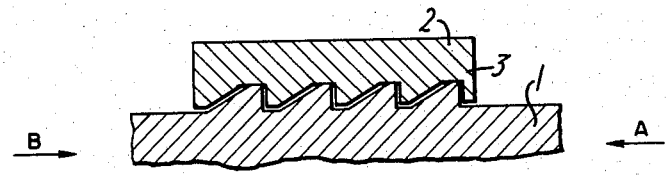
Figure 1 is a diagrammatic fragmentary section showing a typical adjustment screw having predetermined pitch and thread form and engaging a corresponding nut, to explain the principle on which the adjustment device is based.

Referring first to Fig. 1, a threaded rod 1 engages a tapped nut 2. It is apparent that the thread section 3 of the screw 1 has the form of a rectangular trapezoid, somewhat in the fashion of buttress threads. Thus, in one direction of rotation the engagement of the screw with the nut will be similar to that of a square-threaded screw, and will be reversible, provided that the pitch of the helical threads is sufficient (arrow B), whereas in the opposite direction the screw contact is similar to that of a conventional screw having standard or triangular-sectioned threads, with a very inclined generatrix, and will then be irreversible (arrow A).

Figure 2:
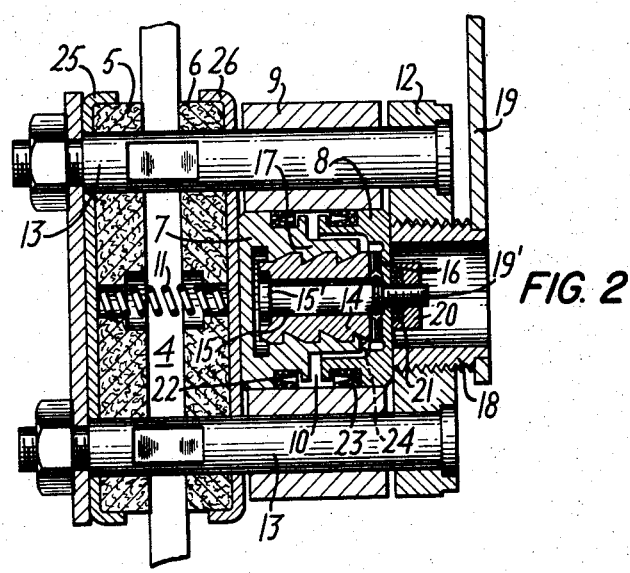
Figure 2 is the practical application of a screw of the type illustrated in Fig. 1 as an automatic adjustment element associated with the friction linings of a disk brake, this view being a section taken upon the axis of the pistons controlling the friction linings.
Figure 3:
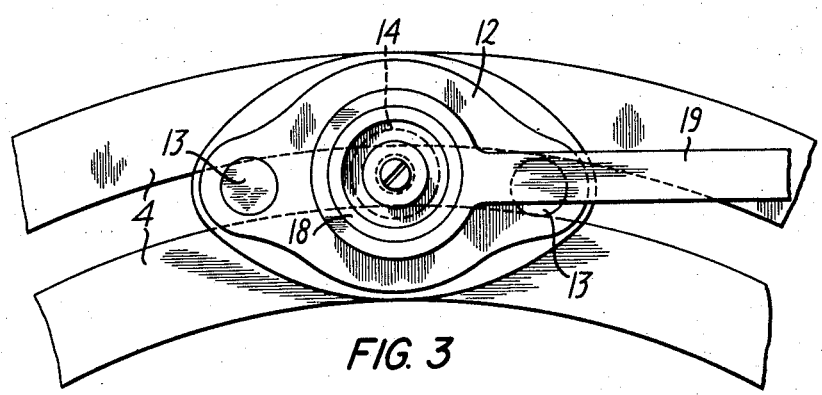
Fig. 3 is a fragmentary elevational view of the device shown in Fig. 2 as seen from the right of Fig. 2, on an enlarged scale.
Figure 4:
Fig. 4 is a plan view of the splines between the piston and the screw.

Referring now to Fig. 2 showing the clamping of a surface 4, for example a brake disk, by two friction linings 5, 6 disposed on either side of the disk, the lining displacement is obtained by means of two pistons 7, 8 mounted in the support 9 of the brake body and actuated, in the embodiment illustrated, by the hydraulic pressure set up in the chamber 10 between the two pistons. Chamber 10 receives liquid under pressure through an inlet port 24 and is provided with packings 22, 23 seated in recesses provided in pistons 7 and 8. A return spring 11 urges the linings to their brake-release position when the hydraulic pressure acting on the pistons 7, 8 is released; spring 11 is mounted between the linings and extends through the annular space formed between the two portions constituting the disk 4, according to known construction. The piston 7 acts directly on the lining 6 and the other piston 8 actuates the lining 5 through the medium of a yoke 12 and bolts 13 which also extend through the annular space between the two portions constituting the disk 4.

The automatic adjustment device or lining wear take-up device constituting the subject-matter of this invention consists essentially, according to the principle set forth hereinabove with reference to Fig. 1, of a screw and nut system of which the practical application will be described hereafter with reference to Fig. 2.

A threaded socket 14 of the type illustrated in Fig. 1, that is, having a thread section in the form of a rectangular trapezoid which, in one direction of rotation ("A" of Fig. 1), is similar to that of a screw having a square thread form, and in the other direction of rotation ("B" of Fig. 1) is similar to that of a screw having a standard or triangular thread form, with a very inclined generatrix, is carried by a shouldered rod 15 secured to the piston 8 and formed with a head 15' for driving the thread socket 14.

During brake application, an axial clearance 16 may be left between the end of screw 14 and the bottom of piston 8. Screw 14 engages the nut 17 consisting of a lateral extension of the piston 7.

This automatic adjustment device operates as follows:

When the brake is in the released state, the spring 11 acts directly upon the piston 7 and indirectly, through the rods 13 and the yoke 12, upon the piston 8, the spring exerting a force which maintains the two pistons in contact with one another. Under these conditions, the rod 15 extends slightly out of the screw socket 14 to an extent corresponding to the play allowed the head 15' and the rod is no longer in direct contact with the socket 14. On the contrary, the adjacent faces of the piston 8 and of the socket 14 are in contact. When the brake is applied, the fluid under pressure, arriving in the chamber 10, separates the two pistons by the maximum distance they are adapted to move. At this moment, the head 15' comes into contact with the socket 14 and causes it to bear with its square threads. Until the linings 5, 6 bear against the brake disc 4, the movement continues, the rod 15 entrains the socket 14 which then turns in the threading of the piston 7 until the moment braking is effected.

Upon release of the brake, the pistons 7 and 8 move toward one another under the action of the spring 11, and the socket 14, entrained by the piston 7, moves into contact with the piston. Thus, wear of the linings brings about an unscrewing of the socket 14 out of the piston 7, whereas the reverse movement is not possible.

The play resulting from lining wear is thus taken up automatically during the subsequent brake application due to the screwing of the threaded socket 14 in the nut 17.

Since the non-reversibility of the screw 14 might be influenced by vibration acting on the mechanism, the registering faces of piston 8 and screw 14, which engage each other under the influence of the return spring 11, are provided with shallow teeth or splines engaging one another to prevent the screw 14 from rotating. The clearance 16 is measured between the two bottoms of these teeth. Any other suitable braking device may be substituted for these shallow teeth. The rod 15 is formed at its outer end with a grooved tip 19' which permits the restoration of the device to its initial position when it is desired to replace the lining. The rod 15 extends through a packing 21 held by a packing nut 20.

A hand-brake control device may be provided which comprises a threaded socket 18 engaging a tapped aperture formed in the yoke 12 and a lever 19 rigidly connected with this socket. This device requires a very sturdy brake adjustment device, notably of the type forming the subject-matter of this invention. In the case of hand braking, when the lever 19 is actuated the screwing action of the threaded socket 18 in the yoke 12 exerts traction upon the rods 13 and at the same time exerts a driving force upon the piston 8. By reason of the irreversible threading between the socket 14 and the piston 17 in the direction of this driving force, the pistons 7 and 8 form a unit move together.

I claim:

1. An automatic adjustment device for disc brakes having a pair of brake linings to compensate automatically for wear of the brake linings comprising, in combination, a first piston and a second piston co-axial therewith adapted to receive a fluid under pressure therebetween upon application of the brakes to drive said pistons apart, said first piston being positioned to act upon one of said linings in a first direction and the second piston being positioned to act on the other of said linings in the opposite direction, whereby movement of said cylinders away from each other causes said linings to move into braking relationship, resilient means normally urging said linings apart, a threaded rod carried axially by said first piston, a screw-threaded socket slidably carried by said rod, the thread of said socket having the form of a rectangular trapezoid and having a predetermined pitch, and a nut integral with said second piston and threadedly engaging said socket, said socket in one direction of rotation providing a thread contact similar to that of a square thread screw and in the opposite direction of rotation providing a thread contact similar to that of a standard thread screw having a sharply inclined generatrix, whereby said socket may rotate in said nut in one direction of rotation but cannot rotate in said nut in the other direction of rotation, said socket being adapted to undergo limited sliding movement relatively to said first piston to provide an axial clearance between said socket and said first piston upon actuation of the brakes whereby said socket may rotate in said nut, but said socket moving to close said clearance upon release of the brakes and movement of said pistons toward one another in response to the action of said resilient means.

2. An automatic adjustment device for disc brakes having a pair of brake linings to compensate automatically for wear of the brake linings comprising, in combination, a first piston and a second piston co-axial therewith adapted to receive a fluid under pressure therebetween upon application of the brakes to drive said pistons apart, said first piston being positioned to act upon one of said linings in a first direction and the second piston being positioned to act on the other of said linings in the opposite direction, whereby movement of said cylinders away from each other causes said linings to move into braking relationship, resilient means normally urging said linings apart, a threaded rod carried axially by said first piston, a screw-threaded socket slidably carried by said rod, the thread of said socket having the form of a rectangular trapezoid and having a predetermined pitch, and a nut integral with said second piston and threadedly engaging said socket, said socket in one direction of rotation providing a thread contact similar to that of a square thread screw and in the opposite direction of rotation providing a thread contact similar to that of a standard thread screw having a sharply inclined generatrix, whereby said socket may rotate in said nut in one direction of rotation but cannot rotate in said nut in the other direction of rotation, said socket being adapted to undergo limited sliding movement relatively to said first piston to provide an axial clearance between said socket and said first piston upon actuation of the brakes whereby said socket may rotate in said nut, but said socket moving to close said clearance upon release of the brakes and movement of said pistons toward one another in response to the action of said resilient means, the cooperating portions of said socket and said first piston defining said clearance upon application of the brakes being provided with positive interengaging means for locking relationship when the brakes are released to prevent relative rotation therebetween.

3. An automatic adjustment device as defined in claim 1, further comprising a yoke acted upon by said first piston formed with a threaded aperture, a socket threadedly engaged in said aperture and engaging said first piston and a hand brake lever rigidly connected to said socket.

References Cited in the file of this patent

UNITED STATES PATENTS

| | | |
|---|---|---|
| 2,106,167 | Colman | Jan. 25, 1938 |
| 2,858,912 | Griswold | Nov. 4, 1958 |

FOREIGN PATENTS

| | | |
|---|---|---|
| 355,390 | Germany | June 26, 1922 |
| 631,880 | Great Britain | Nov. 11, 1949 |